United States Patent Office 3,073,692
Patented Jan. 15, 1963

---

3,073,692
METHOD OF KILLING MICROORGANISMS, PLANT PESTS, AND PLANTS WITH HALOGENATED DIHYDROTHIOPHENE - 1,1 - DIOXIDE COMPOUNDS
Reynold A. Berkey, Painesville, Ohio, assignor to Diamond Alkali Company, Cleveland, Ohio, a corporation of Delaware
No Drawing. Filed Feb. 23, 1960, Ser. No. 10,037
17 Claims. (Cl. 71—2.5)

This invention relates to improved pesticidal methods for killing pests and more particularly to the control of plant growth and various organisms, including bacteria, fungi, nematodes and insects, wherein polyhalo-2,3- dihydrothiophene-1,1-dioxides are employed as active ingredients.

This is a continuation-in-part of Ser. No. 666,252, filed June 17, 1957 now U.S. Patent No. 2,975,194.

More particularly, the present invention relates to the use of novel polyhalo-2,3-dihydrothiophene-1,1-dioxides having the following structure:

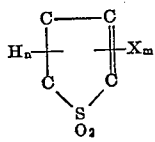

wherein X is a halogen, such as fluorine, chlorine, bromine or iodine, chlorine being preferred, $m$ is a number from 3 to 6, inclusive, and $n$ is a number equal to $(6-m)$, in pesticidal applications.

Illustrative of specific compounds employed in the practice of the present invention are:

3,3,4,5-tetrachloro-2,3-dihydrothiophene-1,1-dioxide

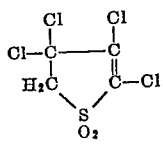

3,3,4-trichloro-2,3-dihydrothiophene-1,1-dioxide

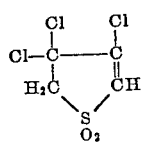

3,3,5-trichloro-2,3-dihydrothiophene-1,1-dioxide

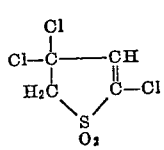

3,4-dichloro-2,3-dihydrothiophene-1,1-dioxide

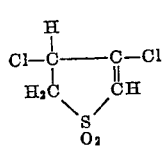

Compounds of the above structure generally exhibit a marked degree of biological activity and are useful in a variety of applications such as fungicides, bactericides, miticides, insecticides, herbicides, soil fungicides, seed protectants, and the like as will be described in more detail hereinafter.

As used in the specification and claims, the terms "pesticide" and "pesticidal" are meant to refer to the killing and/or controlling of the growth of plants, insects, nematodes, microoganisms, fungi, bacteria, or the like. Thus, it will be appreciated that applications commonly termed herbicidal, insecticidal, bactericidal, fungicidal, enmatocidal, or the like, are contemplated.

Novel compounds of this invention as defined by the above-indicated generic formula generally may be prepared by monodehydrohalogenation of a compound of the formula:

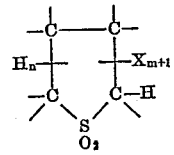

wherein $m$ is a number from 3 to 6, inclusive, and $n$ is a number equal to $(6-m)$. Generally, the monodehydrohalogenation, preferably monodehydrochlorination, of to tetra- to heptachlorotetrahydrothiophene-1,1-dioxide, to obtain a novel compound of this invention is carried out in an organic solvent, usually under alkaline conditions, e.g., as by the addition of a small amount of pyridine. A preferred practice comprises dissolving the compound to be monodehydrohalogenated in a solvent, such as a lower alkyl alcohol, containing a small amount of a soluble base, at an elevated temperature, e.g., the boiling temperature of the organic solvent, and thereafter separating the product, as by adding water to the hot alcoholic solution and cooling the resultant mixture, or by solvent removal.

In order that those skilled in the art may more completely understand the present invention and the preferred methods by which the same may be carried into effect, the following specific examples are offered:

EXAMPLE I

Part A

PREPARATION OF 3,3,4,5-TETRACHLORO-2,3-DIHYDROTHIOPHENE-1,1-DIOXIDE 103.0 gm. (0.352 mol) of 2,3,3,4,4-pentachlorotetrahydrothiophene-1,1-dioxide disclosed in pending application Serial Number 610,655 is dissolved in 750 ml. of hot 85% ethanol and 200 ml. of water is added. The solution is allowed to cool to room temperature whereupon crystallization occurs; the solution is then refrigerated for three hours and filtered. Water is added to 500 ml. of filtrate (90° C.) and the resultant mixture allowed to cool slowly overnight and then further cooled to —25° C. and filtered. The total solids after two recrystallizations from petroleum ether weigh 51.0 g. (M.P. 70.5°–72° C.). Elemental analysis indicates formation of desired $C_4H_2Cl_4O_2S$ and is as follows:

| Element | Actual, Percent by Weight | Calculated, Percent by Weight |
|---|---|---|
| C | 18.72 | 18.77 |
| H | 0.85 | 0.78 |
| Cl | 55.6 | 55.41 |

In the following references to test formulations, aqueous formulations of the indicated concentrations are intended unless otherwise indicated; these formulations are prepared by mixing the toxicant in water, usually employing a solvent, e.g., 5% acetone and an emulsifier, e.g., Triton X-155 (alkyl aryl polyether alcohol).

Part B

The product of Part A is evaluated as a toxicant against the German cockroach and Mexican bean beetle as follows:

(a) German cockroaches (*Blattella germanica*) 8–9 weeks old are anaesthetized with carbon dioxide to facilitate handling and are dipped into test formulations of the product of Part A (2000 p.p.m. and 1000 p.p.m.) for 10 seconds, removed, freed of excessive liquid and caged. Two lots of 10 insects each are so treated. Mortality observations after three days indicate 100% morality at the 2000 p.p.m. concentration and 100% mortality at the 1000 p.p.m. concentration.

(b) Fourth instar larvae of the Mexican bean beetle (*Epilachna varivestis*) less than one day old within the instar are employed. Paired seed leaves excised from Tendergreen bean plants are dipped into test formulations of the product of Part A (2000 p.p.m. and 1000 p.p.m.) until they are thoroughly wetted and then are allowed to dry. Each leaf is placed in a 9 cm. Petri dish with a filter paper liner and 10 randomly selected larvae are introduced. After three days' exposure, it is observed that 100% mortality occurred at the 2000 p.p.m. concentration and 100% mortality occurred at the 1000 p.p.m. concentration.

Part C

To demonstrate fungicidal effectiveness of compounds of this invention, germination tests are conducted using the product of Part A of this example via the procedure recommended by the American Phytopathological Society. This procedure comprises using formulations containing the product of Part A in concentrations (prior to dilution of 4 volumes with 1 volume of spore stimulant and spore suspension) of 1000, 100, 10 and 1 p.p.m., respectively, in tests wherein organisms are contacted therewith to inhibit spore germination. More specifically, spores from 7–10 day old cultures of *Alternaria oleracea* and *Monolinia fructicola* are contacted with the test fungicide. It is observed that the product of Part A has an ED 50 value, i.e., the concentration which inhibits germination of one half the spores in the test drops, regarding both the *A. oleracea* and *M. fructicola* of 0.01 to 0.1 p.p.m. or less, and the same for the *M. fructicola*. This is better than the corresponding ED 50 value of 1–10 p.p.m. exhibited by copper sulfate employed as a standard reference material.

Part D

To demonstrate the ability of the product of Part A to inhibit seed germination, tests are conducted using perennial rye grass and radish seed. These seeds are treated in Petri dishes using aqueous suspension of the product of Part A at concentrations of 1000 and 100 p.p.m. Lots of 25 seeds of each type are scattered in separate dishes containing filter paper discs moistened with 5 ml. of the test formulations. After 7–10 days, the compounds are rated on their ability to inhibit germination of the seeds in a manner similar to that used in Part C of this example. Results of this test indicate that the ED 50 values in the range of less than 10–100 p.p.m. are thus obtained with respect to each type of seed, demonstrating a high degree of seed germination inhibition.

Part E

To evaluate the effect of the tests of the product of Part A upon the germination of seeds in soil, a mixture of seed of six crop plants is placed in 8″ x 8″ x 2″ metal cake pan filled to within one half inch of the top with greenhouse soil. The seed is uniformly covered with about one quarter inch of soil and watered. After 24 hours, 80 ml. of an aqueous test formulation, containing the below shown amounts of the product of Part A, uniformly is sprayed at 10 pounds air pressure over the surface of the pan. This is equivalent to the below shown pounds per acre. The seed mixture contains representatives of 3 Broadleaf plants (turnip, flax and alfalfa), and 3 grasses (wheat, millet and rye).

| Dosage, Pounds per Acre | Estimated Percentage Stand as Compared to Control | |
|---|---|---|
| | Broadleaf | Grass |
| 16 | 0 | 10 |
| 8 | 10 | 40 |
| 4 | 15 | 50 |

Part F

Tests are conducted to demonstrate herbicidal activity of the product of Part A, both via direct action, e.g., by spraying foliage, and by systemic action as indicated by soil watering tests. In the foliage spray test (No. 1) tomato plants of the variety Bonny Best, 5–7 inches tall; (No. 2) corn of the variety Cornell M-1 (field corn 4–6 inches tall); (No. 3) beans of the variety Tendergreen; and (No. 4) oats of the variety Clinton are sprayed with 100 ml. portions of a test formulation of the product of Part A at a concentration of 6400 p.p.m. After the sprayed plants are dried, they are removed to a greenhouse where they are observed 14 days after treatment.

Phytotoxicity is rated on a scale from 0–11, 11 indicating complete kill. As a result of the test on tomato, bean, corn, and oats, values of 11, 11, 2 and 3 are observed, rsepectively, indicating selective action.

In soil watering tests tomato and bean plants of about the same size and variety as used in a spray test are treated by pouring 51 ml. of a 2000 p.p.m. test formulation of the product of Part A into 4 inch pots of soil containing the plants (corresponding to 128 pounds per acre). At the concentrations used, it is observed that the tomato plants are killed and the bean plants receive a rating of 5.

Part G

To indicate the nematocidal effectiveness of the product of Part A, further tests are conducted to illustrate effectiveness as a contact poison against nematodes using the nematode species *Panagrellus redivivus*. In this procedure, the nematodes are exposed to the product of Part A while in small watch glasses (27 mm. in diameter x 8 mm. deep) disposed in a 9 cm. Petri dish.

Using this procedure, fumigant action is demonstrated by placing in three separate Petri dishes, 64, 32 and 16 mg. per dish. Using these concentrations, after 24 hours, percentage mortality values of 86%, 66% and 8%, respectively, are observed.

Part H

To indicate effectiveness as a bactericide, tests are conducted using the product of Part A against the bacteria *Erwenia amylovora* and *Xanthomonas phaseoli*. The growth rating of the two organisms 48 hours after a 4-hour exposure to a 100 p.p.m. concentration test formulation, indicates 0% growth as compared to growth 75% and 94%, respectively, using a control procedure.

Part I

Tests are carried out to determine the effectiveness of the product of Part A in protecting cucumber seeds from seed decay and damping off fungicide. Using the product of Part A, the mean percentage stand at various dosages of active ingredients, expressed as percent of seed weight are as follows:

| Percent Weight by Seed Weight Dosage | Mean Percentage Stand; Days After Planting | | |
|---|---|---|---|
| | 11 | 15 | 20 |
| 0.036 | 57 | 63 | 60 |
| 0.012 | 44 | 51 | 50 |
| 0.004 | 6 | 17 | 17 |

Part J

To illustrate the effectiveness of the product of Part A as an anti-fungal seed protectant, the compound is formulated as a 5% dust using pyrophyllite as a carrier. Pea seeds are then treated with this formulation at 3 different dosages, i.e., 0.018, 0.006 and 0.002% active ingredients, based on seed weight. Eight replications of each dosage are set up in Pythium-infested soil using 25 seeds per replicate. The results obtained are:

| Treatment | Percent Emergence | | | | | | | |
|---|---|---|---|---|---|---|---|---|
| | After 7 Days | | | | After 14 Days | | | |
| | Active Ingredient Dosage Expressed as Percent Seed Weight [1] | | | | | | | |
| | 0.018 | 0.006 | 0.002 | None | 0.018 | 0.006 | 0.002 | None |
| 3,3,4,5-tetrachloro-2,3-dihydrothiophene-1,1-dioxide | 86 | 68 | 26 | | 87 | 69 | 30 | |
| Untreated Soil Control | | | | 0.5 | | | | 1.0 |
| Sterile Soil Control | | | | 65 | | | | 97 |

[1] 0.12 percent by seed weight=1.08 oz./bushel of peas or 0.0625 percent by seed weight=1 oz./100 lbs. of seed.

Part K

To demonstrate fumigant fungicidal activity, a technique is used similar to that employed in Part F of this example, wherein a 9 cm. Petri dish is employed as a test chamber. A spore suspension (½ ml. in duplicate small watch glasses 27 mm. diameter x 8 mm. deep) is placed in the Petri dish with the product of Part A contained in a separate identical watch glass and the lid is closed. Records on inhibition of spore germination are taken after 18 hours. Against *Alternaria oleracea*, concentrations as low as 4 micrograms per test dish completely inhibit spore germination.

Another example of the ability of the product of Part A of this example to protect tomato foliage from early blight by fumigant action is demonstrated in the following procedure: tomato plants exposed to spore suspension, *Alternaria solani*, were placed under inverted battery jars in a pan of water. Small watch glasses containing the product of Part A, evaporated from an acetone solution, were placed on the soil under the plants growing in 4 inch clay pots. The battery jars serve as individual moist chambers so infection occurs. Under these test conditions and at a concentration of 64 micrograms of test compound per battery jar the early blight is completely controlled.

EXAMPLE II

Part A

PREPARATION OF 3,3,4-TRICHLORO-2,3-DIHYDROTHIOPHENE-1,1-DIOXIDE 100.0 g. (0.388 mol) of 3,3,4,4-tetrachlorotetrahydrothiophene-1,1-dioxide, disclosed in pending application Serial Number 645,676, is dissolved in 500 ml. of methanol containing 0.581 mol pyridine for 10 minutes and the resulting solution poured into 3 liters of water. After several recrystallizations from a benzenecyclohexane mixture, 40.8 g. of white crystals melting at 108.5–109.5° C. are obtained. Elemental analysis indicates preparation of the desired $C_4H_3Cl_3O_2S$ and is as follows:

| Element | Actual, percent by Weight | Calculated, percent by Weight |
|---|---|---|
| C | 22.22 | 21.69 |
| H | 1.58 | 1.36 |
| Cl | 48.2 | 48.02 |

Part B

Insecticidal utility for the product of Part A of this example is shown in the following tests:

(a) Using the same Mexican bean beetle test procedure given in Part B of Example I, the product of Part A of this example at a concentration of 2000 p.p.m. caused 100% mortality.

(b) 10 ml. of the above test material at a concentration of 2000 p.p.m. as an aqueous formulation, containing 10% sugar is placed on a piece of cellucotton. 25 house flies, 45 days old, are caged over the thus-treated cellucotton and mortality counts are made after 24 hours. The results of the test show 28% mortality.

Part C

Using the product of Part A of this example to show fungicidal activity, the tests described in Part C of Example I are carried out. Using this procedure, the product of Part A of this example exhibits ED-50 values in the range from 0.01 to 0.1 p.p.m. or lower, against both *A. oleracea* and *M. fructicola*.

Part D

To illustrate the effectiveness of the product of Part A as a soil fungicide via an expression of its ability to protect the seed and seedlings from seed decay and damping off fungicide (Pythium and Fusarium species), infested soil, in 4" x 4" x 3" boxes, is treated by drenching the soil with an aqueous formulation of the product of Part A. Treatment is accomplished by pouring a 32 lb./acre test formulation on the surface of the soil. The thus-treated soil is allowed to stand for one day after which time it is removed from each box and thoroughly mixed before being replaced in the box.

Three days after this treatment, 25 pea seeds, variety Perfection, are planted to a uniform depth in each box. As a control, seeds also are planted in untreated soil and in sterilized soil. Percentage stand is recorded 14 days after planting. Using this procedure at a concentration of 32 lbs./acre, a percentage stand of 1% is obtained on the untreated control and a stand of 85% on the sterilized control whereas a 100% stand is observed from using the test compound, thus indicating a singularly high soil fungicidal activity.

Part E

Beans, variety Tendergreen, and tomato, variety Bonny Best, plants growing in 4" pots are treated by pouring the formulation of the product of Part A at a concentration of 2000 p.p.m. into the pot at an equivalent rate of 128 lbs./acre (102 mg. per pot). Observation 9 and 14 days after treatment shows both the tomato and bean plants, respectively, are killed. Further tests are conducted to demonstrate phytotoxicity both by direct action, e.g., by spraying foliage, and by systemic action, as indicated by soil watering tests. In the foliage spray test, tomato plants of the variety Bonny Best, 5–7" tall, are sprayed with 100 ml. portions of a test formulation of the product of Part A of this example at a concentration of 6400 p.p.m. After the sprayed plants are dried, they are removed to a greenhouse where they are observed 14 days after treatment. Phytotoxicity is rated on a scale from 0–11, 11 indicating complete kill. As a result of the test, the tomato receives a value of 11. In soil watering tests, tomato and bean plants of about the same size and variety as used in the spray tests are treated by pouring 51 ml. of a 2000 p.p.m. test formulation of the product of Part A into 4" pots of soil containing the plants (corresponding to 128 lbs./acre). At the concentration used, it is observed that both the tomato and bean plants are killed.

Part F

Bactericidal activity of the product of Part A is indicated using the test procedure referred to in Part H of Example I with the exception that the bacteria *Staphylococcus aureus* and *Escherichia coli* are used. Growth of the two organisms 48 hours after a 4-hour exposure to the test compound at a concentration of 1000 p.p.m. is 25% and 40%, respectively, whereas in a control, growths of 68% and 60%, respectively, are observed.

Part G

Using the procedure referred to in Part D of Example I, ED-50 values of 10–100 p.p.m. are obtained on the seeds of both the perennial rye grass and radish.

Part H

Using the test procedure referred to in Part E of Example I, the following data are obtained:

| Dosage, Lbs/Acre | Estimated Percentage Stand as Compared to Control | |
|---|---|---|
| | Broadleaf | Grass |
| 64 | 0 | 0 |
| 32 | 0 | 1 |
| 16 | 0 | 15 |

Part I

Non-plant parasitic nematodes (*Panagrellus redivivus*) are exposed to the product of Part A in small watch glasses (27 mm. diameter x 8 mm. deep) within a 9 cm. Petri dish and the results are recorded 24 hours after treatment. Using the above procedure, both a 100% contact mortality and a 100% fumigant mortality at concentrations of 1000 and 500 p.p.m. are observed.

Part J

The procedure of Part K of the first example is repeated with the product of Part A of this example. The same high fumigant activity is observed.

While compounds of the above invention may be employed in a variety of applications, biologically active or otherwise, when employed as biologically active materials, it will be understood, of course, that such compounds may be utilized in diverse formulations, both liquid and solid, including finely-divided powders and granular materials as well as liquids, e.g., solutions, concentrates, emulsifiable concentrates, slurries, and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, such as various clays, diatomaceous earth, talc, spent catalyst, alumina silica materials and such liquid solvents, diluents, etc. as water and various organic liquids such as kerosene, acetone, benzene, toluene, xylene, and other petroleum distillate fractions or mixtures thereof.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of killing plant pests, microorganisms, insects and plants which comprises contacting said pests with a pesticidal amount of a compound having the structure

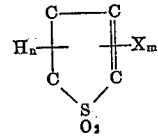

wherein X is halogen, $m$ is a number from 2 to 6, inclusive, and $n$ is a number equal to $(6-m)$.

2. The method according to claim 1 wherein said compound is 3,3,4,5-tetrachloro-2,3-dihydrothiophene-1,1-dioxide.
3. The method according to claim 1 wherein said compound is 3,3,4-trichloro-2,3-dihydrothiophene-1,1-dioxide.
4. The method according to claim 1 wherein said compound is 3,3,5-trichloro-2,3-dihydrothiophene-1,1-dioxide.
5. The method according to claim 1 wherein said compound is 3,4-dichloro-2,3-dihydrothiophene-1,1-dioxide.
6. The method of regulating plant growth which comprises applying to growing plants a herbicidal amount of the composition of claim 1.
7. The method of regulating plant growth which comprises applying to growing plants a herbicidal amount of the composition of claim 2.
8. The method of regulating plant growth which comprises applying to growing plants a herbicidal amount of the composition of claim 3.
9. The method of regulating plant growth which comprises applying to growing plants a herbicidal amount of the composition of claim 4.
10. The method of regulating plant growth which comprises applying to growing plants a herbicidal amount of the composition of claim 5.
11. The method of killing microorganisms which comprises contacting said microorganisms with a lethal amount of a compound of the formula:

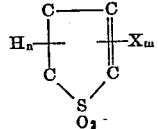

wherein X is halogen, $m$ is a number from 3 to 6, inclusive, and $n$ is a number equal to $(6-m)$.

12. The method according to claim 11 wherein the killing is effected via fumigant action.
13. The method of killing nematodes which comprises contacting said nematodes with a nematocidal amount of a compound having the structure

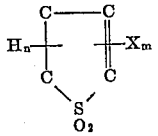

wherein X is halogen, $m$ is a number from 3 to 6, inclusive, and $n$ is a number equal to $(6-m)$.

14. The method of killing bacteria which comprises contacting said bacteria with a bactericidal amount of a compound having the structure

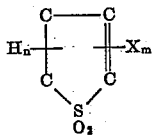

wherein X is halogen, $m$ is a number from 3 to 6, inclusive, and $n$ is a number equal to $(6-m)$.

15. The method of killing fungi which comprises contacting said fungi with a fungicidal amount of a compound having the structure:

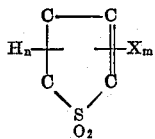

wherein X is halogen, $m$ is a number from 3 to 6, inclusive, and $n$ is a number equal to $(6-m)$.

16. The method of killing insects which comprises contacting said insects with an insecticidal amount of a compound having the structure:

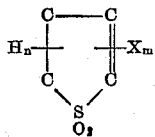

wherein X is halogen, $m$ is a number from 3 to 6, inclusive, and $n$ is a number equal to $(6-m)$.

17. The method of killing plants which comprises contacting said plants with a herbicidal amount of a compound having the structure:

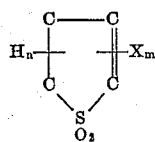

wherein X is halogen, $m$ is a number from 3 to 6, inclusive, and $n$ is a number equal to $(6-m)$.

References Cited in the file of this patent

UNITED STATES PATENTS

| | | |
|---|---|---|
| 2,504,099 | Morris et al. | Apr. 18, 1950 |
| 2,928,766 | Rosen | Mar. 15, 1960 |
| 2,937,972 | Bluestone et al. | May 24, 1960 |
| 2,939,871 | Pyne et al. | June 7, 1960 |
| 2,957,887 | Berkey et al. | Oct. 25, 1960 |

FOREIGN PATENTS

| | | |
|---|---|---|
| 542,599 | Belgium | Nov. 30, 1955 |
| 536,564 | Canada | Jan. 29, 1957 |